United States Patent [19]
Naggert

[11] 3,986,407
[45] Oct. 19, 1976

[54] HYDRAULIC CHAIN TAKE-UP

[75] Inventor: Dietrich K. Naggert, Oak Forest, Ill.

[73] Assignee: The Continental Group, Inc., New York, N.Y.

[22] Filed: July 28, 1975

[21] Appl. No.: 599,576

[52] U.S. Cl. ................. 74/242.1 FP; 74/242.11 R; 74/242.15 R
[51] Int. Cl.² ...................... F16H 7/12; F16H 7/10
[58] Field of Search ............ 74/242.1 FP, 242.11 R, 74/242.15 R

[56] References Cited
UNITED STATES PATENTS

| | | | |
|---|---|---|---|
| 2,054,443 | 9/1936 | Pierson | 74/242.1 FP |
| 2,818,311 | 12/1957 | Ashley, Jr. | 74/242.1 FP |
| 3,140,975 | 7/1964 | Corbin | 74/242.11 R X |
| 3,329,561 | 7/1967 | Rojecki et al. | 74/242.11 R X |
| 3,413,865 | 12/1968 | Nimtz et al. | 74/242.11 R X |
| 3,463,022 | 8/1969 | Miller | 74/242.11 X |
| 3,647,270 | 3/1972 | Althaus | 74/242.14 R X |

Primary Examiner—Leonard H. Gerin
Attorney, Agent, or Firm—Joseph E. Kerwin; John J. Kowalik; Paul J. Lerner

[57] ABSTRACT

An improved hydraulically actuated take-up device, for use with conveying members subject to both sudden accelerations and variations in length resulting from changes in thermal loading, wherein a portion of the member is displaced to maintain a predetermined tension therein. Minor corrections are effected gradually through action of a hydraulic damper while a relief valve prevents tension build-up beyond a predetermined limit. The action of the take-up may be reversed to relieve the tension on the member to facilitate periodic maintenance and adjustment.

27 Claims, 1 Drawing Figure

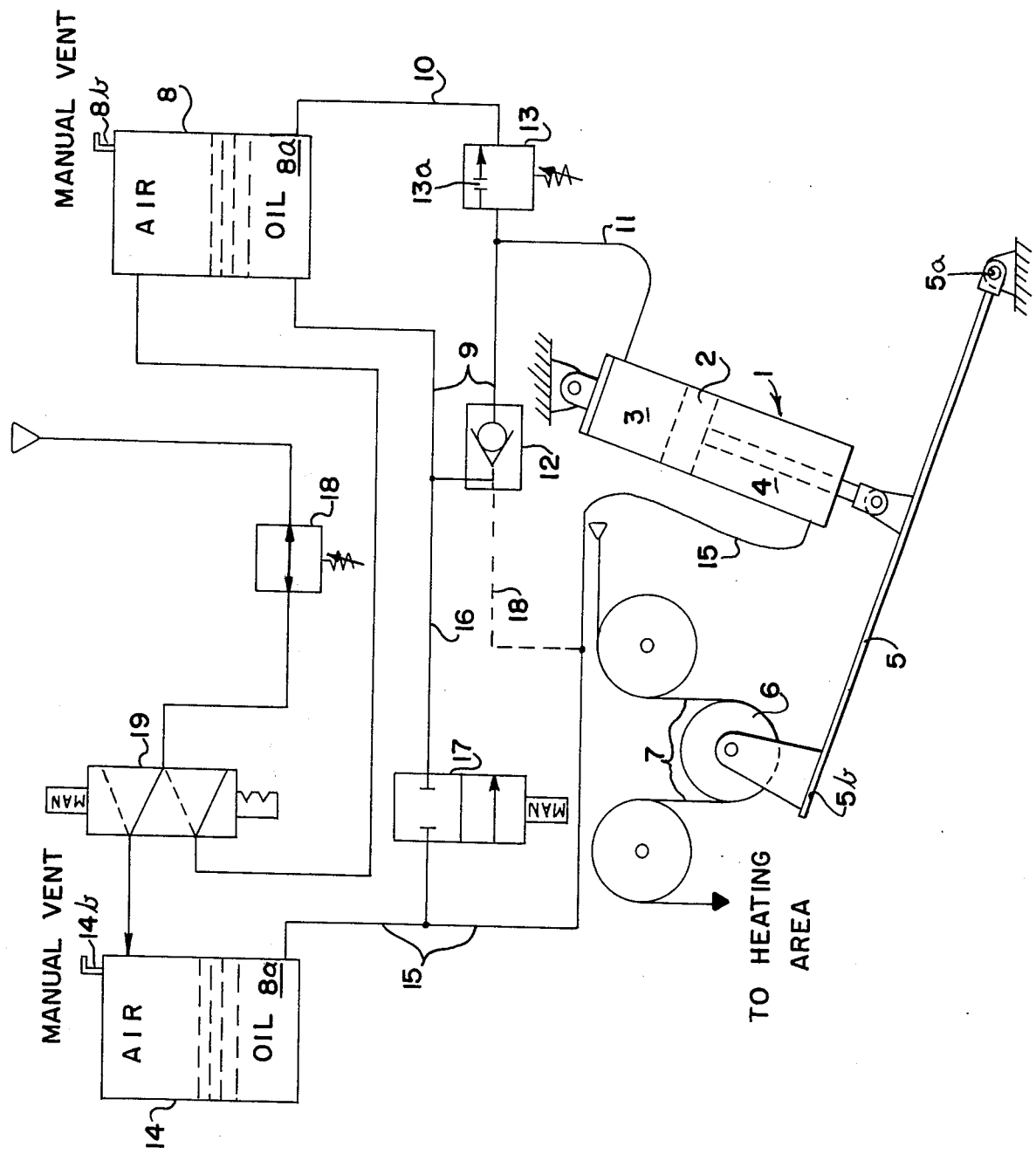

HYDRAULIC CHAIN TAKE-UP

SUMMARY OF THE INVENTION

The present invention relates to a device for maintaining a predetermined tension in a flexible, extensible member such as a chain and, more particularly, to a chain take-up device.

A large number of manufacturing processes, most notably processes relating to the application of a coating such as painting, lacquering or printing, involve the use of a heated drying area such as an oven or heat tunnel to speed drying of the applied coating. Commonly, the newly coated articles are carried on a heat resistant conveyor which passes through the drying area. This conveyor, which generally takes the form of a metal link belt or similar chain-like member, is thus subjected to a substantial localized thermal load which results in expansion of the conveyor components and, hence, elongation of the member. An example of this effect may be seen in can printing lines, wherein a chain conveyor with an initial length of approximately 800 feet undergoes an elongation of approximately one foot as a result of heating. This elongation produces a slackening of the conveyor which frequently causes the conveyor to disengage itself from the drive sprockets. This problem becomes most acute when it is desired to change the speed of the conveyor. At such times, the inertia of the conveyor, coupled with the slackness, results in a high probability of drive disengagement. This problem is further complicated by various factors, such as the ambient temperature outside the heating area, which result in variations in the degree of elongation.

The current solution of this problem involves the attachment of weights to the conveyor in such manner as to displace a portion thereof, thus taking up the slack. An automotive-type shock absorber is occasionally employed as a means of damping the oscillation occurring during sudden changes of speed of the conveyor. This solution is unsatisfactory in that, during a sudden speed change, the relatively slow response time of the automotive-type dampers is insufficient to prevent the inertial movement of the conveyor from resulting in drive disengagement. Increasing the attached weight to overcome this problem produces problems of overresponse caused by the inertia of the weight. Further, use of excessive weights imparts a high strain on the conveyor, and causes excessive wear of drive and support members.

It is therefore a primary object of the present invention to provide an improved take-up device for use with conveying members subject to both sudden accelerations and variations in length resulting from changes in thermal loading. More specifically, it is an object to maintain a predetermined tension on the conveying member to insure proper contact between the member and the drive and support members.

It is another object to provide a take-up device with a rapid response time and which avoids the problem of overresponse.

It is a further object to provide a take-up device which minimizes both conveyor member strain and wear of the conveyor support and drive members.

BRIEF DESCRIPTION OF THE DRAWING

The various features and advantages of the take-up device of this invention will be more apparent from the following detailed description when considered in a connection with the accompanying drawing wherein;

FIG. 1 is a schematic diagram of the invention and illustrating the relative placement of the various components.

DESCRIPTION OF THE PREFERRED EMBODIMENT

As shown in the accompanying drawing, the take-up device of the present invention includes a double acting hydraulic cylinder 1 having a piston 2 slidably mounted therein which divides the cylinder 1 into first and second chambers 3 and 4 respectively, both of the chambers 3 and 4 being adapted to receive hydraulic fluid therein.

The piston 2 is pivotably fastened to a lever arm 5 having one end 5a thereof pivotably fastened to a support member and a second end 5b depending from an idler pulley 6 which rides on the conveyor member 7.

A first hydraulic reservoir 8, having hydraulic fluid 8a therein, is connected to the first chamber 3 of the cylinder 1 by a supply line 9 and a return line 10 both of which include a common conduit segment 11. The supply line 9 contains a pilot operated check valve 12 which permits flow from the reservoir 8 to the cylinder 1 only. The return line 10 contains a relief valve 13 which prevents substantial flow therethrough at pressures below a predetermined level but permits a constant, minimal leakage to the reservoir through a small orifice 13a.

A second hydraulic reservoir 14, having hydraulic fluid 8a therein, is connected to the second chamber 4 of the cylinder 1 by a reversal supply line 15. A pilot line 18 connects the reversal supply line 14 with the check valve 12 in the supply line 9.

The supply line 9 and the reversal supply line 15 are connected by a connecting line 16 having a manual shut-off valve 17 therein.

The first and second reservoirs 8 and 14 are connected to a source of compressed air through a pressure regulator 18 and a 2-position manually operated valve 19. Both reservoirs 8 and 14 are equipped with manually operated vents 8b and 14b respectively for reducing or bleeding the pressure therein to atmospheric.

In operation, the first reservoir vent 8b and the connecting line shut-off valve 17 are closed and the air valve 19 is adjusted to direct compressed air into the first reservoir 8, pressurizing the hydraulic fluid 8a therein. The vent on the second reservoir 14 is open. If the conveyor member 7 elongates, as may occur if the temperature in the heating area (not shown) is increased, fluid 8a flows through the supply line 9 and the common conduit into the first chamber of the cylinder 1 forcing the piston 2 downwardly. This displacement causes a rotation of the lever arm 5 about its point of attachment at 5a which, in turn, causes a displacement of the portion of the conveyor member 7 near the idler pulley 6. The displacement continues until the predetermined tension is achieved. Fluid 8a in the second chamber 4 displaced by the movement of the piston 2 flows through the reversal supply line 15 to the second reservoir 14.

If the conveyor member 7 contracts, as may occur if the temperature is reduced, the piston 2 is forced upwardly displacing fluid 8a from the first chamber 3. This fluid 8a flows through the common conduit 11 and the return line 10, passing through the orifice 3a in the pressure relief valve 13, and enters the reservoir 8. The limited capacity of the orifice 13a serves to dampen the response of the system and prevents overreaction which produces a momentary slack condition in the conveyor member 7 allowing disengagement from the drive and support members (not shown). If the contraction of the conveyor member 7 is more severe, causing an excessive fluid pressure in the first chamber 3 and the common conduit 11, the relief valve 13 opens allowing more rapid flow, thereby reducing the pressure to a predetermined maximum level. When this predetermined level is reached, the valve 13 closes.

If it is desired to relieve the tension on the conveyor member 7 to facilitate maintenance and adjustment, the vent 14b of the second reservoir 14 is closed, the vent 8b of the first reservoir 8 is opened and the air valve 19 is adjusted to pressurize the second reservoir 14. Fluid 8a from the reservoir 14 is forced through the reversal supply line 15 and into the second chamber 4 of the cylinder 1, displacing the piston 2 upwardly. This displacement of the piston 2 causes the lever arm 5 to rotate so as to lift the idler pulley 6, thereby relieving the tension on the conveyor member 7. A portion of the fluid 8a flowing through the reversal supply line 15 passes through the pilot line 18 and opens the check valve 12 on the supply line 9. The fluid in the first chamber 3 displaced by the movement of the piston 2 flows up through the common conduit 11 and the supply line 9, passing through the check valve 12 which is held open as previously described, and enters the first reservoir 8.

During operation of the invention in the tension maintenance mode as described hereinabove, a small amount of fluid from the first chamber 3 is forced between the piston 2 and the body of the cylinder 1 and into the second chamber 4 and eventually into the second reservoir 14. Thus, over a period of time, the fluid level in the first reservoir 8 drops while the level in the second reservoir 14 rises. To equalize the fluid level in the two reservoirs 8 and 14, the compressed air is shut off and the vents 8b and 14b of both reservoirs 8 and 14 are opened. The shut-off valve 17 is then opened allowing fluid to pass from the second reservoir 14 to the first reservoir 8 by way of the reversal supply line 15 the connecting line 16 and the supply line 9.

I claim:

1. A device for controlling the tension in a flexible, extensible member, said device comprising fluid operated actuator means operably connected to said extensible member for displacing a portion thereof in response to changes in pressure of the operating fluid, a first fluid source containing operating fluid, means for maintaining said fluid in said first source at a predetermined pressure, first conduit means connecting said source and said actuator means for passage of operating fluid therebetween, and said first flow regulation means in said first conduit means including damping means for controlling the pressure of said operating fluid in said actuator means so as to prevent overresponse to variations in tension of said extensible member.

2. The device of claim 1, wherein said actuator means comprises a cylinder having a piston slidably fitted therein, said piston defining a first chamber in said cylinder, said first chamber being adapted for admission of said operating fluid thereinto.

3. The device of claim 2, wherein said first flow regulation means includes pressure limiting means for limiting the pressure of said operating fluid in said first chamber to a predetermined level.

4. The device of claim 3, wherein said first conduit means comprises first supply means and first return means both connected to said first chamber and said damping means comprises means for controlling the direction of flow through said first supply means and flow restricting means in said first return means.

5. The device of claim 4, wherein said direction controlling means comprises a check valve in said first supply means permitting passage of said fluid from said first source to said first chamber.

6. The device of claim 5, wherein said pressure limiting means comprises a relief valve in said first return means.

7. A device for controlling the tension in a flexible, extensible member, said device comprising fluid operated actuator means operably connected to said extensible member for displacing a portion thereof in response to changes in pressure of the operating fluid, a first source containing operating fluid, means for maintaining said fluid in said first source at a predetermined pressure, first conduit means connecting said source and said actuator means for passage of operating fluid therebetween, and first flow regulation means in said first conduit means for controlling the pressure of said operating fluid in said actuator means to prevent overresponse to variations in tension of said extensible member, said actuator means comprising a cylinder having a piston slidably fitted therein, said piston defining a first chamber in said cylinder, said first chamber being adapted for admission of said operating fluid thereinto, said first flow regulation means comprising damping means for gradually equalizing the pressures of said operating fluid in said first chamber and said first source, and pressure limiting means for limiting the pressure of said operating fluid in said first chamber to a predetermined level, said first conduit means comprising first supply means and first return means both connected to said first chamber, said damping means comprising means for controlling the direction of flow through said first supply means and flow restricting means in said first return means, said direction controlling means comprising a check valve in said first supply means permitting passage of said fluid from said first source to said first chamber, said pressure limiting means comprising a relief valve in said first return means, said flow restricting means comprising an orifice formed in said return means, said orifice permitting a minimal flow of operating fluid from said first chamber to said first source when the pressure in said first chamber is between the first source pressure and the predetermined pressure limit.

8. The device of claim 7, wherein said orifice is formed in said relief valve.

9. The device of claim 8, wherein said operating fluid in said first source is a liquid.

10. The device of claim 8, and reversal means whereby said device may be operated to reduce the tension in said extensible member.

11. The device of claim 10, wherein said reversal means comprises a second fluid source containing operating fluid, means for maintaining said fluid at a predetermined pressure, second conduit means connecting said second source and said actuator, and a second chamber in said cylinder, said second chamber being adapted for admission of said operating fluid thereinto.

12. The device of claim 11, wherein said second conduit means comprises second supply means connected to said second chamber and second return means connecting said first chamber with said first source, said second return means providing substantially unrestricted flow therethrough at pressures below the predetermined pressure limit for said first chamber.

13. The device of claim 12, wherein said second return means comprises said first supply means and means for enabling flow therethrough from said first chamber to said first source.

14. The device of claim 13, wherein said flow enabling means comprises pilot tube means connecting said second supply means and said check valve whereby operating fluid from said second supply means opens said check valve thereby permitting said flow from said first chamber to said first source.

15. The device of claim 14, wherein said operating fluid in said second source is a liquid.

16. The device of claim 15, and means connecting said first and second sources whereby the fluid levels in both of said source means may be equalized.

17. The device of claim 16, wherein said connecting means comprises connecting conduit means and a shutoff valve thereon.

18. A device for maintaining a predetermined tension in a chain or similar member subject to variations in length, said device comprising actuator means operably connected to said chain for displacement of a portion thereof in response to said length variations, said actuator means including a first chamber, a first operating fluid source and operating fluid therein, means for maintaining said operating fluid in said first source at a predetermined pressure, a supply line and a return line connecting said first source to said first chamber for passage of said fluid therebetween, and flow regulation means including damping means for maintaining the pressure in said first chamber within predetermined limits so as to prevent overresponse to variations in tension of said extensible member.

19. The device of claim 18, wherein said flow regulation means comprises a check valve on said supply line, said check valve permitting flow from said first source to said first chamber only, and a pressure relief valve on said return line.

20. A device for maintaining a predetermined tension in a chain or similar member subject to variations in length, said device comprising actuator means operably connected to said chain for displacement of a portion thereof in response to said length variations, said actuator means including a first chamber, a first operating fluid source and operating fluid therein, means for maintaining said operating fluid in said first source at a predetermined pressure, a supply line and a return line connecting said first source to said first chamber for passage of said fluid therebetween, and flow regulation means for maintaining the pressure in said first chamber within predetermined limits to prevent overresponse to variations in tension of said extensible member, said flow regulation means comprising a check valve on said supply line, said check valve permitting flow from said first source to said first chamber only, a pressure relief valve on said return line and damping means on said return line for gradually reducing pressure increases in said first chamber, said damping means comprising an orifice in said return line permitting a minimum flow of operating fluid from said first chamber to said first source when the pressure in said first chamber is between the first source pressure and the predetermined pressure limit.

21. The device of claim 20, wherein said orifice is in said pressure relief valve.

22. The device of claim 21 and reversal means for operating said device to reduce the tension in said chain.

23. The device of claim 22, wherein said reversal means comprises a second fluid source having operating fluid therein, means for maintaining said operating fluid at a predetermined pressure, a second chamber in said cylinder, said second chamber being adapted to receive said operating fluid thereinto, a reversal supply line for supplying operating fluid from said second source to said second chamber, and means enabling substantially unobstructed flow of said operating fluid from said first chamber to said second source at pressures below said predetermined pressure limit.

24. The device of claim 23, wherein said flow enabling means comprises a pilot line on said reversal supply line connected to said check valve, the pressure of the fluid from said pilot line unseating said check valve whereby said fluid may flow from said first chamber to said first source.

25. A device for maintaining a predetermined tension on a chain or similar member subject to length fluctuations, said device comprising a double acting hydraulic cylinder and piston, said piston being operably attached to said chain for displacement of a portion thereof in response to said length fluctuations, a first fluid source having hydraulic fluid therein, means for maintaining said fluid in said first source at a predetermined pressure, and a supply line and a return line each connecting said first source with a first end of said cylinder, said supply line having a check valve therein, said return line having a pressure relief valve and a damping orifice thereon.

26. A device for maintaining a predetermined tension on a chain or similar member subject to length fluctuations, said device comprising a doubleacting hydraulic cylinder and piston, said piston being operably attached to said chain for displacement of a portion thereof in response to said length fluctuations, a first fluid source having hydraulic fluid therein, means for maintaining said fluid in said first source at a predetermined pressure, and a supply line and a return line each connecting said first source with a first end of said cylinder, said supply line having a check valve therein, said return line having a pressure relief valve and a damping orifice thereon, said damping orifice being formed in said pressure relief valve.

27. The device of claim 26 and reversal means for reducing the tension of said chain, said reversal means comprising a second fluid source, having operating fluid therein, means for maintaining said fluid in said second source at a predetermined pressure, a reversal supply line connecting said second source to a second end of said cylinder, and a pilot line connecting said reversal supply line to said check valve whereby said check valve is held open consequent to operation of said reversal means thereby permitting flow of said operating fluid therethrough from said first end of said cylinder to said first source.

* * * * *